(12) United States Patent
Nallasamy et al.

(10) Patent No.: US 12,670,073 B2
(45) Date of Patent: Jun. 30, 2026

(54) DATA STORAGE LINEAGE SYSTEM AND METHOD

(71) Applicant: Hewlett Packard Enterprise Development LP, Spring, TX (US)

(72) Inventors: Jayasankar Nallasamy, Bangalore (IN); Ranjani Nagarajan, Bangalore (IN); Ajay Yadav, Bangalore (IN); Rashmi Narayan, Bangalore (IN); Samuel John, Bangalore (IN); Pruthvi Raju, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 61 days.

(21) Appl. No.: 18/978,088

(22) Filed: Dec. 12, 2024

(65) Prior Publication Data

US 2026/0064539 A1 Mar. 5, 2026

(30) Foreign Application Priority Data

Aug. 30, 2024 (IN) .............................. 202441065681

(51) Int. Cl.
G06F 11/00 (2006.01)
G06F 11/1446 (2026.01)

(52) U.S. Cl.
CPC ...... *G06F 11/1461* (2013.01); *G06F 11/1466* (2013.01)

(58) Field of Classification Search
CPC .................................................... G06F 11/1461
See application file for complete search history.

(56) References Cited

U.S. PATENT DOCUMENTS

| | | | | |
|---|---|---|---|---|
| 10,474,695 | B1 * | 11/2019 | Holenstein | .......... G06F 11/2097 |
| 11,403,184 | B1 * | 8/2022 | Kumar | ................ G06F 11/1479 |
| 2008/0082375 | A1 * | 4/2008 | Kennis | ............. G06Q 10/06393 |
| | | | | 705/7.39 |
| 2019/0073246 | A1 * | 3/2019 | Altuzar | .................... G06F 9/50 |

* cited by examiner

*Primary Examiner* — Amine Riad
(74) *Attorney, Agent, or Firm* — Hewlett Packard Enterprise Patent Department

(57) ABSTRACT

A computer-implemented system and method can be used to identify policy information applicable to a compute resource within a specified time range, the policy information related to data management for the compute resource. Based on the identified policy information, a set of expected data management events for the compute resource is generated within the specified time range. The set of expected data protection events is modified based on information related to exceptions to the data management indicated by the policy information. The modified set of data protection events provides lineage information for the compute resource.

20 Claims, 13 Drawing Sheets

300

310 — Store Policy Information

312 — Request Lineage Information

314 — Identify Applicable Policies

316 — Generate Expected Data Management Events

318 — Modify Expected Data Management Events

320 — Output Lineage Information

1100

1200

LINEAGE CREATION TIME

DATA STORAGE LINEAGE SYSTEM AND METHOD

BACKGROUND

In modern data management systems, tracking and managing data across multiple storage locations and throughout its lifecycle has become a consideration. Organizations encounter challenges in maintaining visibility into their data footprint, particularly as the volume of data and the complexity of storage environments increase. Data lineage is a process of recording and visualizing data as it flows from data sources. Data lineage information serves various purposes, including compliance audits, cost management, and response to security threats. As the scale of data storage expands, the complexity of storing, retrieving, and analyzing lineage information also grows.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
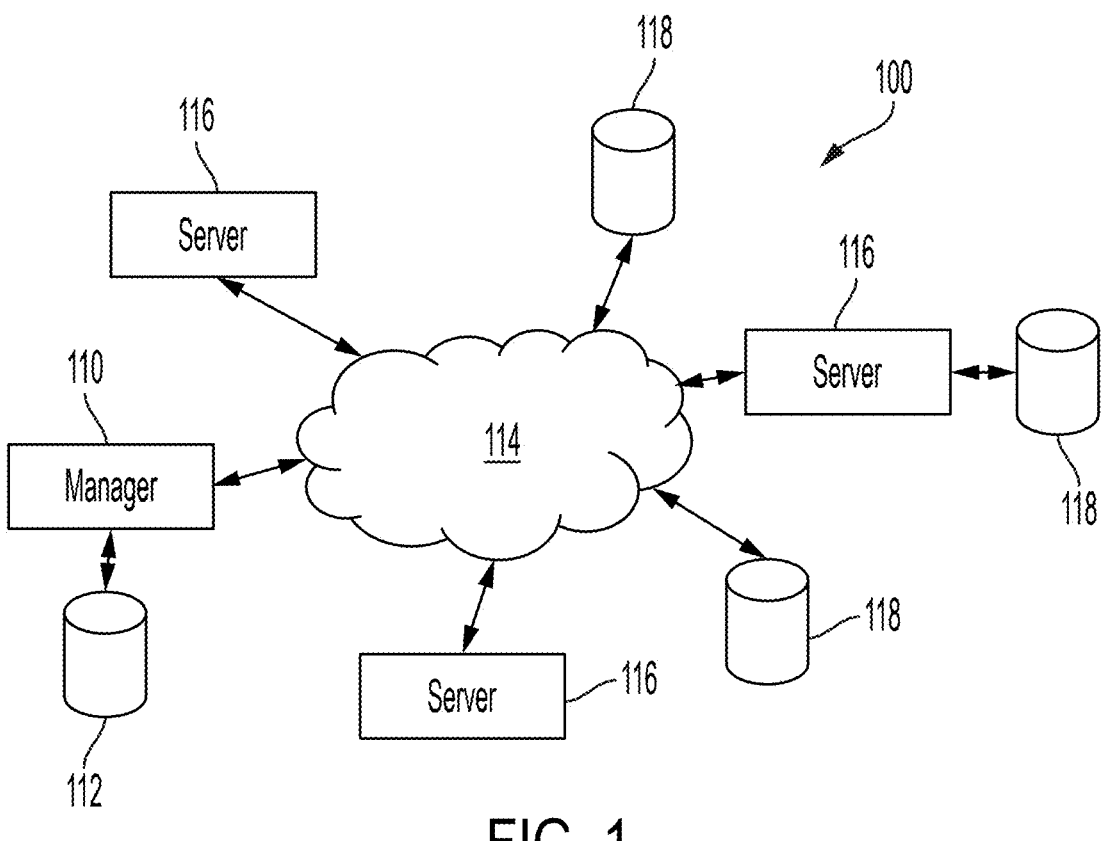
FIG. 1 depicts a system for data management according to example implementations.

The following disclosure provides many different examples for implementing different features. Specific examples of components and arrangements are described below to simplify the present disclosure. These are, of course, merely examples and are not intended to be limiting.

Data storage lineage involves tracking how data assets propagate through replication, cloning, snapshotting, and backup across diverse locations such as virtual stores, clouds, or on-premises appliances. This process can be used to quickly identify data linkages, for example, during security incidents like ransomware attacks, and then isolate copies, user access, authorization, and infection risk mitigation. A challenge in implementing the storage lineage involves storing and retrieving the linkages because the number of lineage records rapidly grows whenever a copy is made for a data asset. Typically, numerous assets are configured to create a copy either within a data center or across different locations, which leads to an accumulation of numerous records. Example implementations can provide an efficient way to store and retrieve lineage information in real time, regardless of the number of copies, instead of linear scaling.

Another aspect relates to establishing associative relations across data centers and storage systems. Time-context information can be used to identify uninfected backups. These methods are useful, e.g., in disaster recovery scenarios, such as those implemented with Zerto™. In this context, continuous data protection provides granular recovery to any point in time. The identification of recovery copies for a given time interval can allow the recovery of clean and uninfected data. This capability assists administrators in making informed decisions enabling the restoration of safe recovery points.

Example implementations provide a method for capturing time-sensitive data lineage information with minimal storage requirements. This real-time generation approach can enable rapid search, generation, and representation of data lineages based on backup creation policies. The approach can also aid in quickly identifying compromised copies during security incidents within a specified time frame.

Data protection involves automated, policy-driven processes applied to resources needing backup. These policies specify backup frequency, target locations, retention periods, and backup properties. Example implementations consider these factors and utilize applicable policies within a given time range to establish data lineage views.

One way to create data lineage would be to search for all backups in a large database for a specific resource, filter the backups for the requested time range, verify the existence and validity of filtered backups, retrieve additional information on backups used for recovery and their locations, and present the generated records to fulfill the request. This process would be repeated for multiple resources as needed.

One issue with this method of data lineage create is scalability. For example, an implementation with 10,000 virtual machines that need to be protected, where each virtual machine has one policy each for daily, weekly, and monthly backup generations, would accumulate one million entries for a three-month. Storage of these entries would require at least 100 MB for the database records alone. The time for retrieval of some of these resources will grow as the number of entries grow.

Example implementations utilize two data models that store minimal information compared to existing methods. Policy information is utilized to construct the lineage tree instead of storing every lineage record individually. Exception information can then be utilized to modify the lineage based on events outside the policy. In other words, the method uses policy and exception information instead of individual backup details. With this information, the lineage view is created dynamically only upon request.

When the lineage view for a resource for a certain period is requested, the following steps can be executed. The policies applicable to the resource for the given time frame can be found from the lineage model. For each applicable policy, the interval time can be used to calculate the backup copies that would be created in this period. For each backup, the target at which it was created and expiry date can be determined using the information in lineage model. For each backup created in the prior step, entries in the recovery-failure-delete model table can be found and excluded from the backup from the lineage view for cases where the backup was never created or was deleted after creation. For each backup created in the prior step, entries in the recovery-failure-delete model table will also be searched in case the backup was used as a recovery point. This information can then be returned as the data to be used for presenting the lineage view.

Example implementations will be discussed with respect to the figures.

FIG. 1 illustrates a system 100 for data management. The system 100 comprises a manager 110, a network 114, multiple servers 116, and multiple storage units 118. In various embodiments, the system 100 can provide lineage information for data backup and recovery processes.

The manager 110 is a computing device that coordinates data management operations within the system 100. This device can be a standalone computer or a distributed group of computers. In an example implementation, the manager 110 is coupled to a dedicated storage unit 112. The storage unit 112 may contain software executable by the manager 110 to perform various data management functions. Further detail of one example is provided in FIG. 2, which is discussed below.

The network 114 interconnects the components of the system 100, enabling communication between the manager 110, servers 116, and storage units 118. This network-based architecture allows for distributed data processing and storage capabilities across multiple devices.

The network 114 facilitates data exchange and coordination between the manager 110, servers 116, and storage units 118. In various implementations, the network 114 can be implemented as a cloud-based service. The network 114, however, is not limited to cloud implementations. It may also be realized as a local area network (LAN), wide area network (WAN) such as the Internet, a virtual private network (VPN), or a combination of these technologies. The network 114 can utilize various communication protocols and security measures to ensure reliable and secure data transmission.

The servers 116 are computing devices that interact with the manager 110 and storage units 118 via the network 114. In one or more embodiments, the servers 116 execute specific tasks as directed by the manager 110, such as data processing, temporary storage, or data transfer operations. In one example implementation, which will be discussed in more detail below, data backups can be distributed among various ones of the storage units 118.

The storage units 118 provide persistent data storage for the system 100. These units may be directly connected to the network 114 or accessed through the servers 116. In an example implementation, the storage units 118 can store backup data, recovery points, or other information relevant to the data management processes.

The storage units 118 can be implemented using a variety of technologies, such as solid-state drives (SSDs) for high-speed data access, hard disk drives (HDDs) for cost-effective bulk storage, or a combination of both to balance performance and capacity. Long term storage can utilize tape drive storage. The storage units 118 may utilize network-attached storage (NAS) devices, storage area network (SAN) systems, or object storage platforms for scalable and flexible data management. In an example implementation, the storage units 118 can incorporate redundant array of independent disks (RAID) configurations to enhance data reliability and fault tolerance. Additionally, these units may employ data deduplication, compression, or encryption technologies to optimize storage efficiency and enhance data security. The specific implementation of the storage units 118 can be designed considering factors such as data volume, access patterns, retention policies, and regulatory requirements.

The servers 116 and storage units 118 are meant to be representative of the various compute resources that are interconnected by network 114. The compute resources can include computing power (virtual machines or serverless functions), storage capacity (object storage, file systems, or databases), networking infrastructure (load balancers, virtual private networks), and various platform services (e.g., machine learning, analytics, Internet of Things devices), as examples.

The configuration depicted in FIG. 1 is just one example. The system 100 can be adapted based on operational requirements. For example, the system 100 can be implemented in various computing environments, including on-premises data centers, cloud infrastructures, or hybrid setups.

Figure 2:
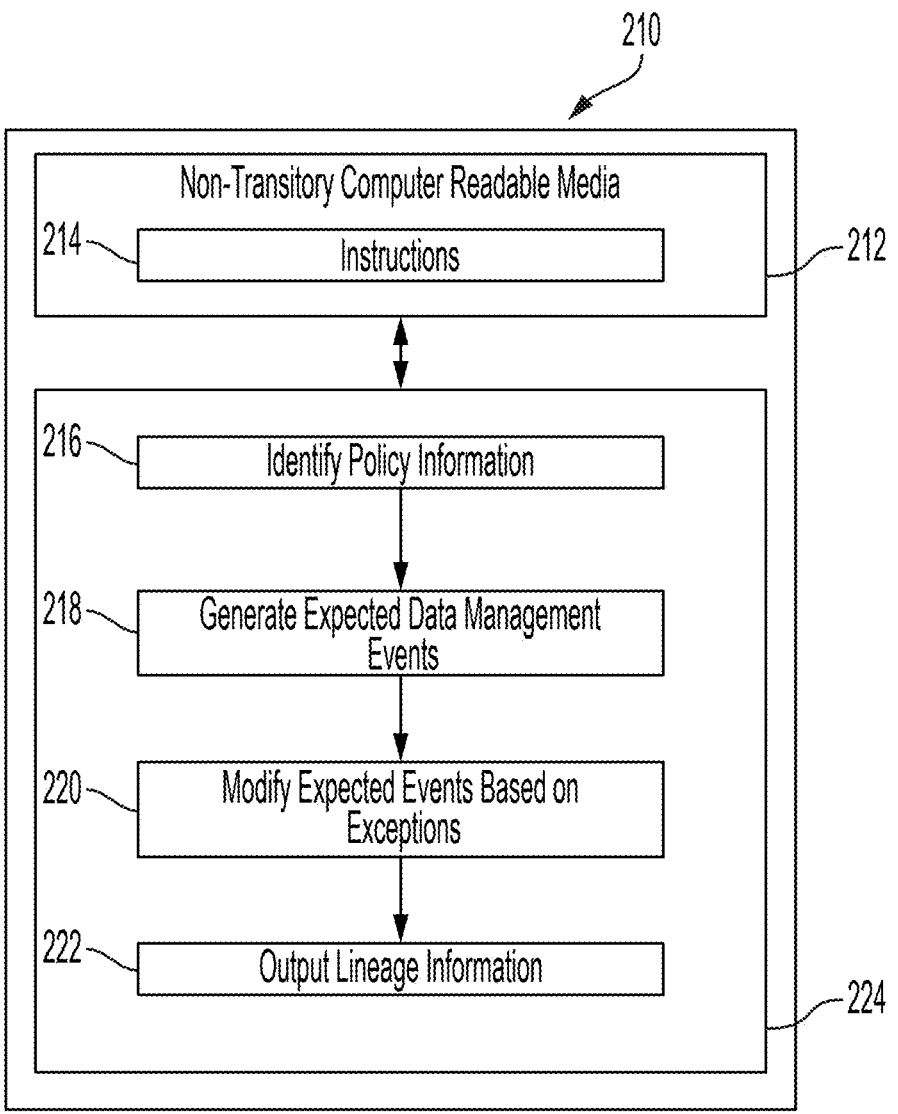
FIG. 2 depicts a computer device configured to execute a series of operations for data management according to example implementations.

FIG. 2 illustrates a computer device 210 configured to execute a series of operations for data management. The computer device 210 comprises a non-transitory computer readable medium 212 that stores instructions 214. These instructions 214 are executable by one or more processors 224 to perform a method for managing data lineage.

In step 216 of the instructions, the system identifies policy information applicable to a compute resource, e.g., server 116 or storage units 118, within a specified time range. The policy information is related to data management for the compute resource. For example, the policy information may relate to data retention, backup schedules, or other data management protocols. In example implementations, the policy information is obtained from a policy engine that centralizes and manages data governance rules across the system.

For example, the policy information may comprises a resource identifier, a policy identifier, an interval specifying a frequency of data events, and a target indicating a storage location for data of the compute resource. The policy information may further comprises a start time indicating when the policy became applicable to the compute resource and an end time indicating when the policy became no longer applicable to the compute resource. When the data management comprises data storage or retention, the policy information may further comprise expiry information indicating for how long the data is stored. More detailed description of particular examples is provided below.

Following the identification of policy information, Expected data management events are generated (step 218). These events may include scheduled backups, data migrations, or other data management tasks. The generation of these events is based on the identified policy information. Since the data management policy is known, the lineage history can be generated by reconstructing the management events. This lineage would be accurate if there were no exceptions to the policy.

In step 220, the method modifies the expected events based on exceptions. In an example implementation where the lineage is based on data backup, the exceptions may include the information related to recovery events, protection failure events, or deletion events, as examples. In an example implementation where the lineage is based on data recovery, the exception information may comprise a replication failure event, a data corruption event, or a recovery point creation event, as examples.

In step 222, the lineage information is output. This lineage information can provide a comprehensive record of data transformations, movements, and management actions. It may include details such as the origin of data, any transformations applied, and the current location or state of the data.

In a backup context, data lineage can track the complete lifecycle of data from its origin through various transformations and backup operations. This information enables administrators to understand the full history of data, including when and where backups were created, what transformations were applied, and how data has moved between different storage locations. Data lineage can be used to verify compliance with backup policies and regulations and to ensure that data retention requirements are met. In some example implementations, lineage information helps in identifying the most recent valid backup for a given dataset, which is used for efficient data recovery operations. Additionally, data lineage can be utilized to optimize backup processes by identifying redundant or unnecessary backups. In the event of data corruption or loss, lineage information can be used to trace the last known good state of the data, e.g., to facilitate more targeted and efficient recovery efforts.

In example implementations, the method may incorporate additional features. For instance, the system may compare actual data management events with the expected events to identify discrepancies. It may also analyze these discrepancies to determine their impact on data lineage and overall system performance.

The method 224 may further include steps to generate reports based on the lineage information. These reports can provide insights into data usage patterns, policy compliance, and the efficiency of data management processes. In an example implementation, the system might use machine learning algorithms to predict future data management needs based on historical lineage information and identified patterns.

Additionally, the method 224 may involve steps to validate the accuracy of the lineage information. This could include cross-referencing the lineage data with logs from various system components, ensuring the integrity and reliability of the lineage information.

Figure 3:
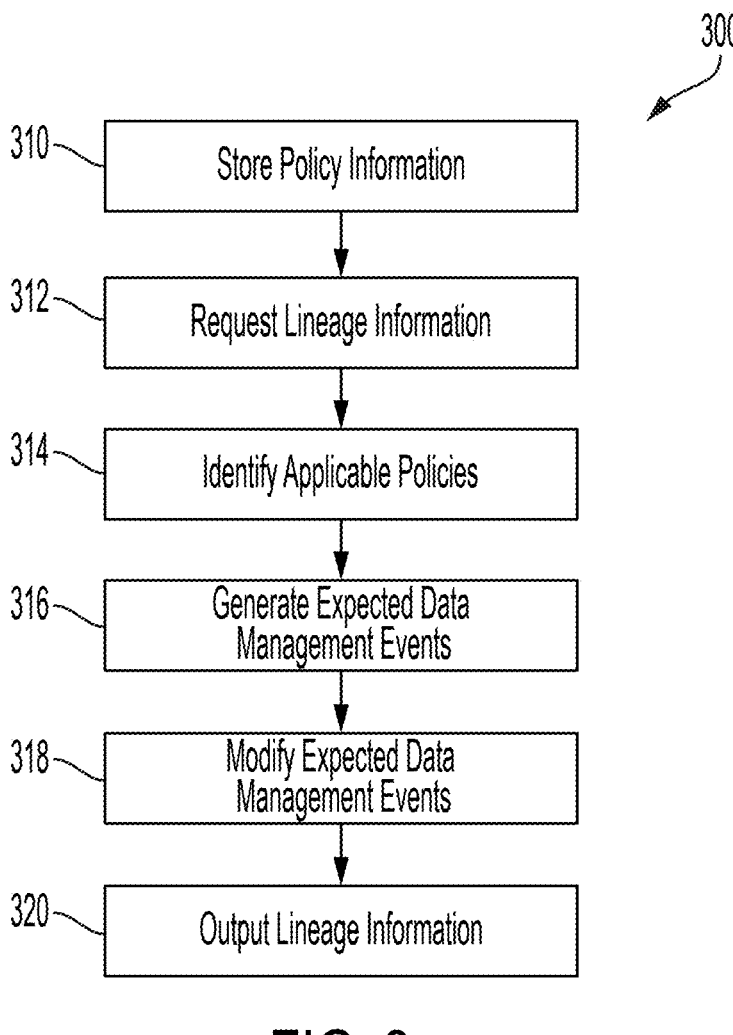
FIG. 3 depicts a flow chart of a data management process according to example implementations.

The flow chart of FIG. 3 summarizes an example implementation of the method 300 described herein. In step 310, the policy information is stored. This step 310 can, for example, include storing policy information for data history related to data of each resource of a plurality of resources and also storing exception information related to the data history of the plurality of resources. These steps can create two models for recovering the lineage history.

As will be discussed in more detail below, the policy information can be stored in a first data structure and the exception information can be stored in a second data structure. The first data structure and the second data structure store information sufficient to generate lineage information for any of the plurality of resources.

The models can then be utilized to create the data lineage information. For example, a request for the lineage information can be received for one of the resources over a specified time range (step 312). From the first data structure, applicable policies can be identified for the one of the resources within the specified time range (step 314). A set of expected data management events can then be generated based on the identified applicable policies (step 316). The set of expected data management events can then be modified based on exception information from the second data structure (step 318). The modified set of data management events provides the lineage information for that resource over the specified time range. The lineage information can then be output, e.g., to be utilized by a system administrator (step 320).

Figure 4:
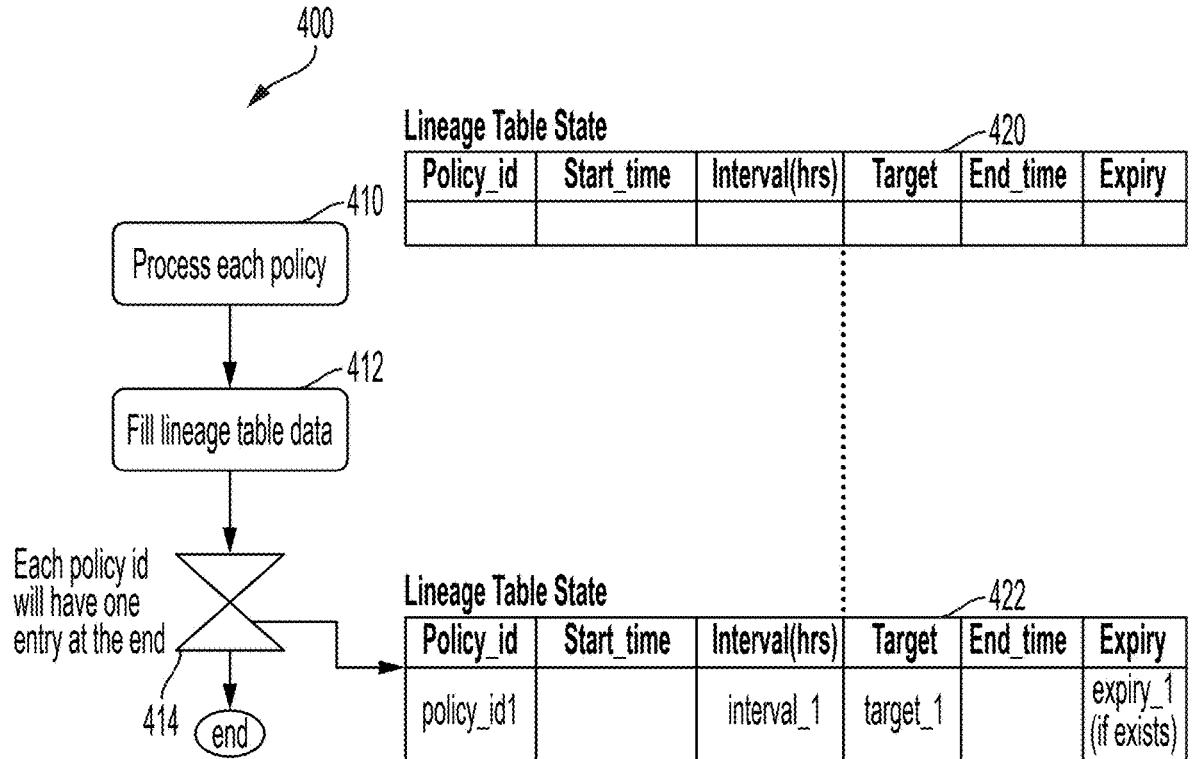
FIG. 4 depicts a chart showing the creation of a lineage model according to example implementations.

FIG. 4 depicts the creation of a lineage model. Typically, policy-driven data protection specifies the frequency and location for creating backups. Example implementations leverage automatic and interval-based mechanisms to identify the backups created within a specified time range. In the lineage model, for each policy that is applicable to a resource, an entry is made that contains information about the policy id, start and end time of the policy for that resource and the frequency at which the backup was created using this policy.

In example implementations, a lineage model can store information in a data structure, an example of which is shown below. This data structure can be used to provide information related to each policy.

| policy_id | start_time | interval | target | end_time | expiry |
|-----------|------------|----------|--------|----------|--------|

The data structure shown above includes entries identifying the policy (policy_id), when the policy became effective (start_time), how often backups are implemented (interval), where the backup will be saved (target), when the policy is no longer valid (end_time), and how long the backup will be saved (expiry).

Referring now to FIG. 4, a method 400 for lineage model creation in a data management system comprises several steps that process protection policies to generate a lineage table state. This method is related to the processing of the protection policy.

Step 410 indicates the processing of each policy. This step may include parsing the policy details and extracting relevant information. Following policy processing, step 412 fills the lineage table data. This step populates the lineage table with the information extracted from the processed policies. In some example implementations, this may involve mapping policy attributes to specific fields in the lineage table and performing any necessary data transformations.

Step 414 represents the completion of the process for each policy ID. In example implementations, this step ensures that each policy has a corresponding entry in the lineage table, maintaining a one-to-one relationship between policies and table entries.

The right side of FIG. 4 displays the structure and evolution of the lineage table. The initial data structure 420 shows the empty lineage table state with column headers as discussed above. This data structure provides a framework for organizing the lineage information.

The filled-in data structure 422 demonstrates how the lineage table appears after processing a policy. In this example implementation, a policy with ID "policy_id1" has been processed and added to the table. The interval and target fields are populated with "interval_1" and "target_1" respectively. The Expiry field contains "expiry_1," indicating that expiration information is included when applicable.

This method 400 for lineage model creation enables the systematic processing of protection policies and the generation of a structured lineage table. In example implementations, this approach facilitates efficient tracking of data lineage, policy enforcement, and management of data protection processes. The resulting lineage table provides a clear and organized view of policy implementations.

Figure 5:
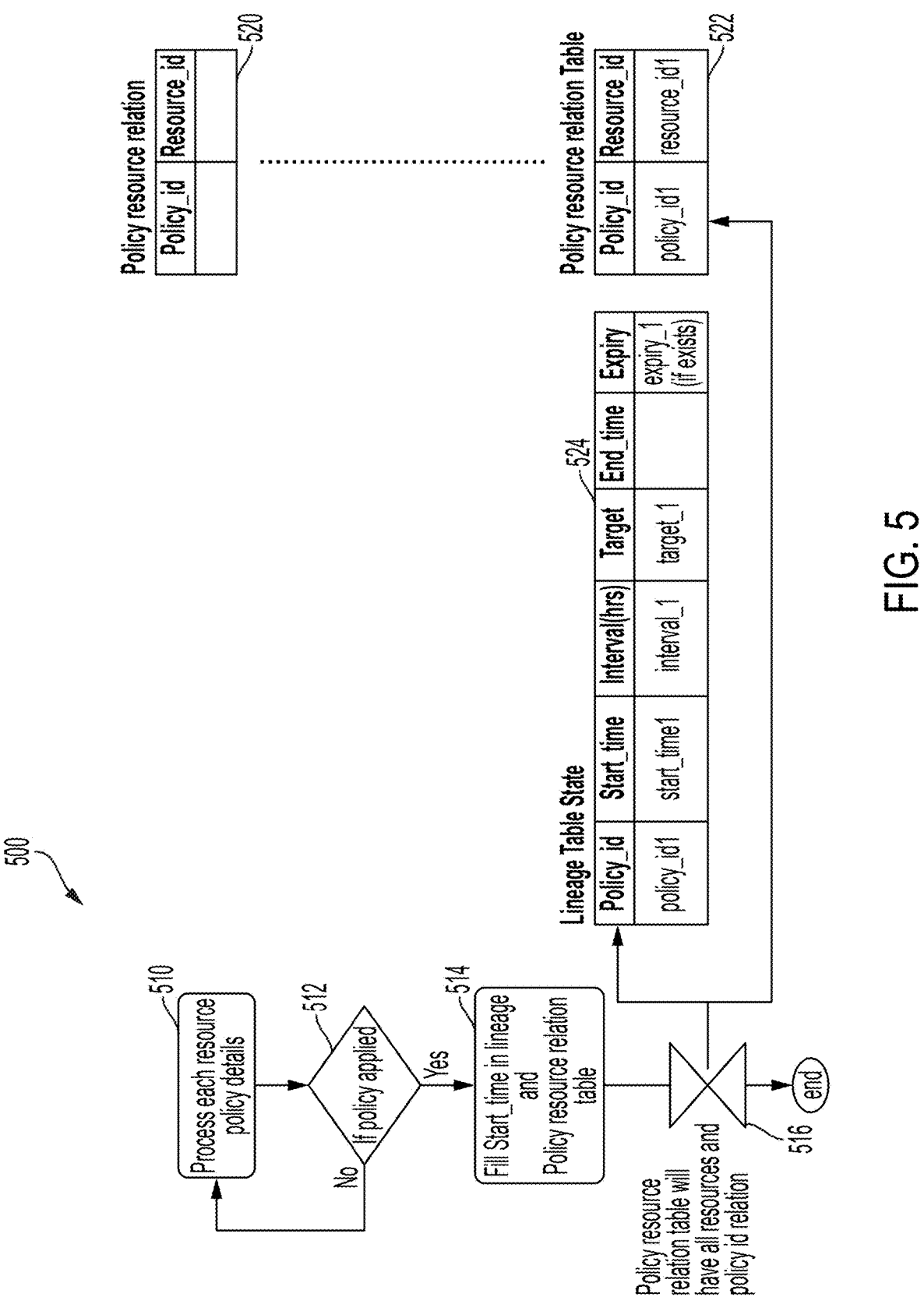
FIG. 5 depicts a flow chart for a method for processing resources and policies in a data management system according to example implementations.

FIG. 5 illustrates a method 500 for processing resources and their relationships to policies in a data management system. The method 500 comprises several steps that process resource policy details and populate both a lineage table and a policy resource relation table.

An example data structure for the lineage table state is shown below. This data structure includes a number of fields. A resource ID (resource_id) is provided for each resource and a policy ID (policy_id) indicates a policy that is used for that resource. A single resource may be associated with multiple policies and each policy typically applies to multiple resources. The time period over which the policy applies to the resource is provided by indicating the start and end times (start_time, end_time). The data structure also includes information related to how often backups will occur (interval), where the backup will be stored (target), and how long the backup will be kept (expiry).

| resource_id | policy_id | start_time | interval | target | end_time | expiry |
|---|---|---|---|---|---|---|

Referring to FIG. 5, step 510 involves processing each resource policy detail. This step may include extracting relevant information from the resource policies, such as policy identifiers and associated resource identifiers. The information can be obtained, for example, from the lineage table state data structure 422.

Step 512 represents a decision point where the system determines if a policy is applied to the resource being processed. If a policy is applied, the process continues to step 514. Otherwise, the algorithm will go back to step 510 to process the next resource policy details. This step can ensures that only resources with associated policies are further processed.

In step 514, the system populates the lineage table state data structure 524. In the illustrated example, the applicable policy, start time, interval, and target are populated. If an end time is found, this field will also be populated. The same applies to the expiry. This step links the policy information with the resource information and establishes the temporal aspect of the policy application.

Step 516 represents the completion of the process for each policy-resource relation. In example implementations, this step ensures that all relevant information for each policy-resource pair has been properly recorded in both the lineage table and the policy resource relation table.

The right side of FIG. 5 displays the structure and evolution of the data tables involved in this process. The initial data structure 520 shows the empty policy resource relation table with columns for Policy_id and Resource_id. This structure provides a framework for linking policies to their respective resources. The filled-in data structure 522 shows the policy resource relation table after processing. It contains an entry linking the policy to the resource to track the relationship between the policy and the resource it applies to.

This method 500 for processing resources and their policy relationships enables the systematic tracking of how policies are applied to specific resources over time. The resulting tables can provide an organized view of policy-resource relationships and their temporal aspects.

Figure 6:
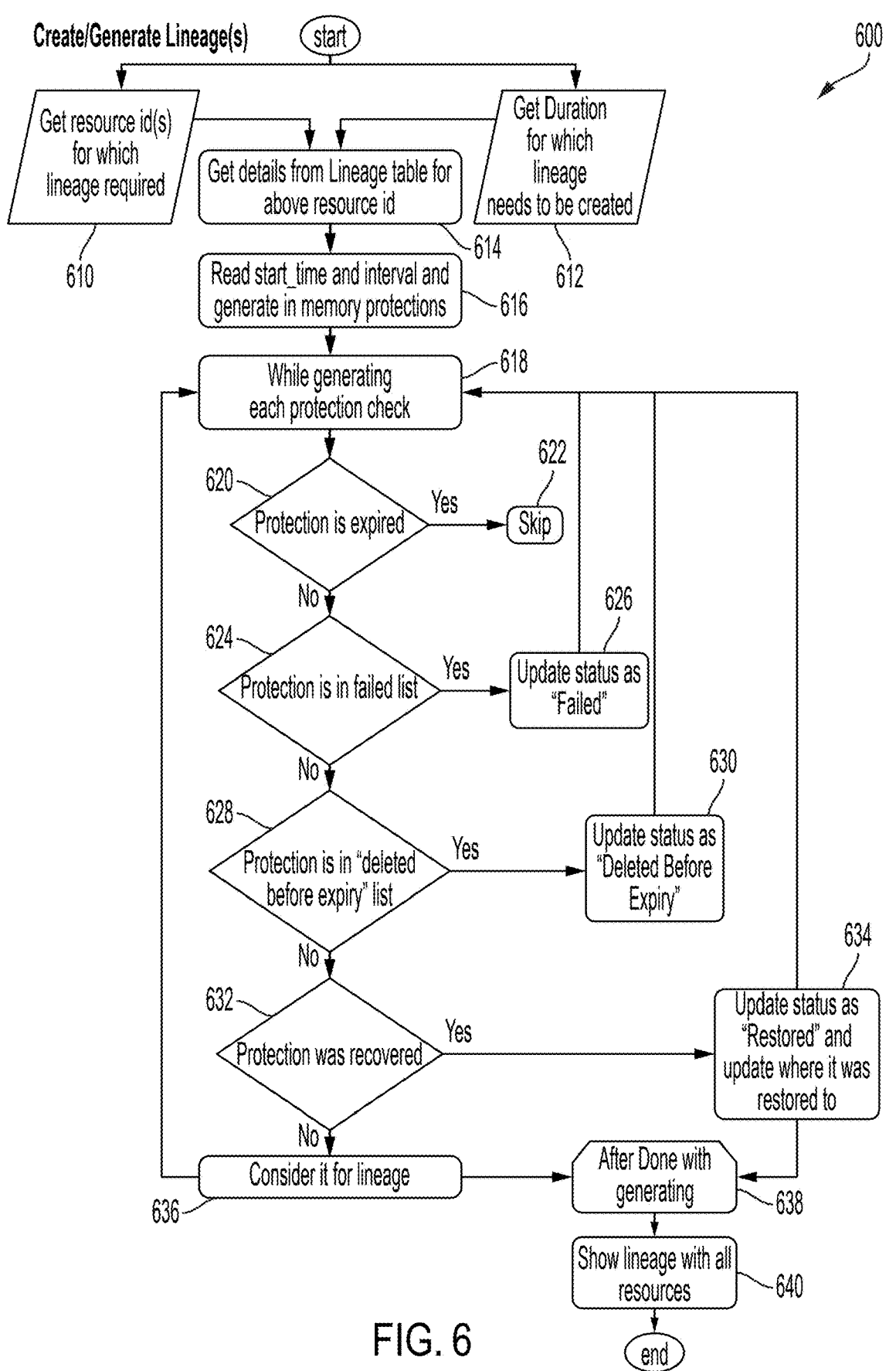
FIG. 6 depicts a flow chart for a method for creating and generating lineage information in a data management system according to example implementations.

FIG. 6 depicts a method 600 for creating and generating lineage information in a data management system. The method provides one example of applying exceptions to the lineage generated based on the policies.

The method 600 begins with two processes that can be performed in any order (or concurrently). Step 610 involves identifying the resources for which lineage is required, while step 612 involves obtaining the duration for which lineage needs to be created. These initial steps define the scope of the lineage generation process. In step 614, the system retrieves details from the lineage table for the specified resources.

Step 616 then reads the start time and interval data, using this information to generate in-memory protections. This step might involve a process of creating temporary data structures in the computer's RAM (Random Access Memory) that represent protection events or states for the resources being managed. In example implementations, generating in-memory protections allows the system to simulate or reconstruct the protection history for the resources in question.

The loop starting at step 618 indicates the processes performed for generating each protection. The steps 620 to 636 can be performed in any order (or concurrently). This loop can allow for an evaluation of the status of each protection and appropriate updating of the lineage information.

Within this loop, several decision points and actions are defined. Step 620 checks if the protection has expired. If the step has expired, this policy does not apply to this resource. As such, the flow skips to the next protection (step 622).

If not expired, step 624 checks if the protection is in a failed list. If so, step 726 updates the status as "Failed" or the like, thereby indicating that this particular backup did not occur. If the back did not fail, step 628 checks if the protection is in a "deleted before expiry" list. If yes, the backup has been deleted and step 630 indicates that a status as "Deleted Before Expiry" or the like. If not in the deleted list, step 632 checks if the backup was recovered. If so, step 634 updates the status as "Restored" or the like and updates where it was restored to.

If the backup did not occur or was deleted, the lineage history will provide that information along with the reason. While the reasons have been indicated as either failed or expired, it is possible to categorize with further detail or granularity. For example, the failures can be parsed by failure type. Similarly, reasons for the restoration could also be indicated.

If none of the above conditions are met, the lineage determined from the policy is unchanged. This condition is indicated by step 636. The system can optionally provide a status note indicating that the condition was unchanged.

After processing all backups, step 638 indicates the completion of the generation process. Finally, step 640 shows the lineage with all resources.

This method can enable comprehensive tracking of protection statuses and their changes over time. It accounts for various scenarios such as expiration, failure, premature deletion, and recovery, providing a detailed and accurate representation of data lineage.

As noted above, the lineage can help facilitate activities such as data management, compliance, and auditing and offer insights into the lifecycle of protected resources. By systematically evaluating and updating the status of each protection, the current lineage information can be recreated without having to track each individual action.

Figure 7:
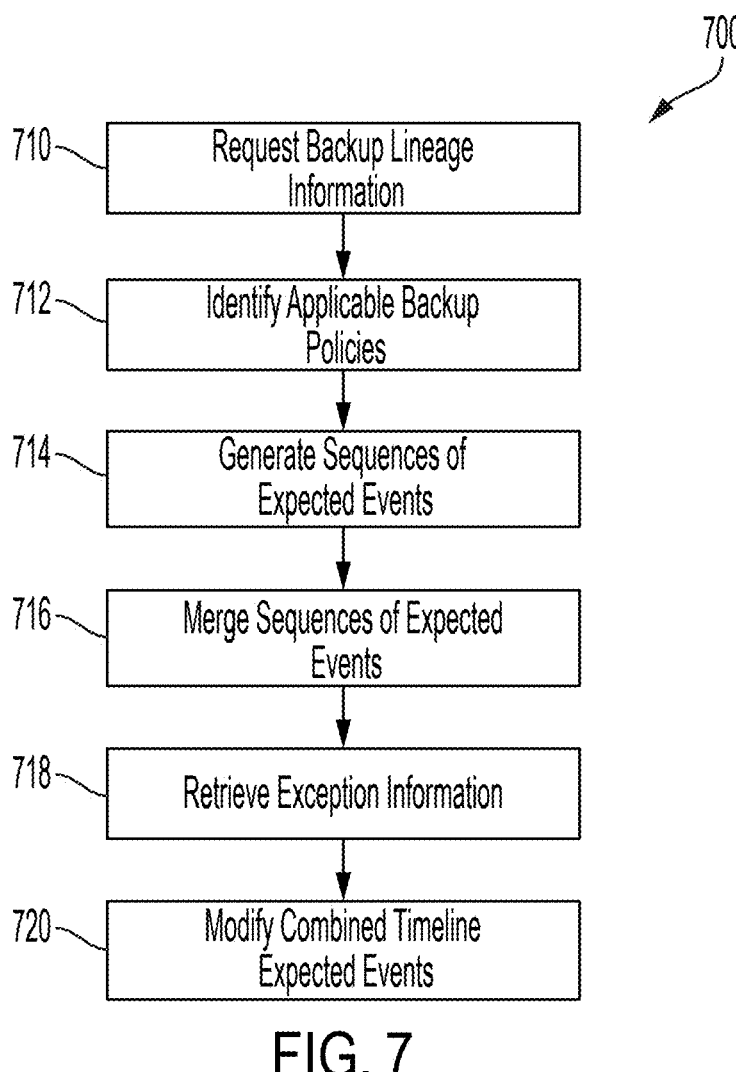
FIG. 7 depicts a flow chart for a method generating lineage information in a data management system according to example implementations.

FIG. 7 depicts a computer-implemented method 700 according to example implementations. In step 710, a request for backup lineage information is received for a particular compute resource over a specified time range. A plurality of backup policies applicable to the compute resource are identified in step 712.

For each identified policy, a sequence of expected backup events within the specified time range is generated in step 714. These events can be generated based on a start timestamp, end timestamp, and backup interval of that policy, for example, retrieved from the data structure 524. In step 716, the sequences of expected backup events from all identified policies is merged into a combined timeline of expected backups.

Exception information related to the compute resource within the specified time range can then be retrieved (step 718). The exception information can comprise actual backup events that differ from expected backups, backup failure events, or backup deletion events, as examples. In step 720, the combined timeline of expected backups is modified based on the retrieved exception information to create an actual backup lineage. The actual backup lineage can then be provided as the backup lineage information for the compute resource over a specified time range.

The lineage information can be used to restore the backup data. In other words, the method described in FIG. 7 can include a step of restoring back data. As an example, this can occur when a storage device has a physical or security issue. The damaged or corrupted data can be replaced with appropriate data as determined by the lineage.

For any give resource, the identified policies might overlap with the specified time range. For example, a backup system could store daily backups for one week, weekly backups for a month, and periodic monthly backups. In a data retrieval example, an initial backup is saved and incremental backups indicating changes to the initial backup are saved on a monthly, weekly, and daily basis. The data from any particular day can then be retrieved from these backups.

As discussed above, the backup policies applicable to the compute resource are retrieved from a database having a data structure organized to store a policy identifier, a start timestamp indicating when the policy became active for the compute resource, an end timestamp indicating when the policy ceased to be active for the compute resource, a backup interval specifying a time between scheduled backups, and a target location for storing backups.

Figure 8:
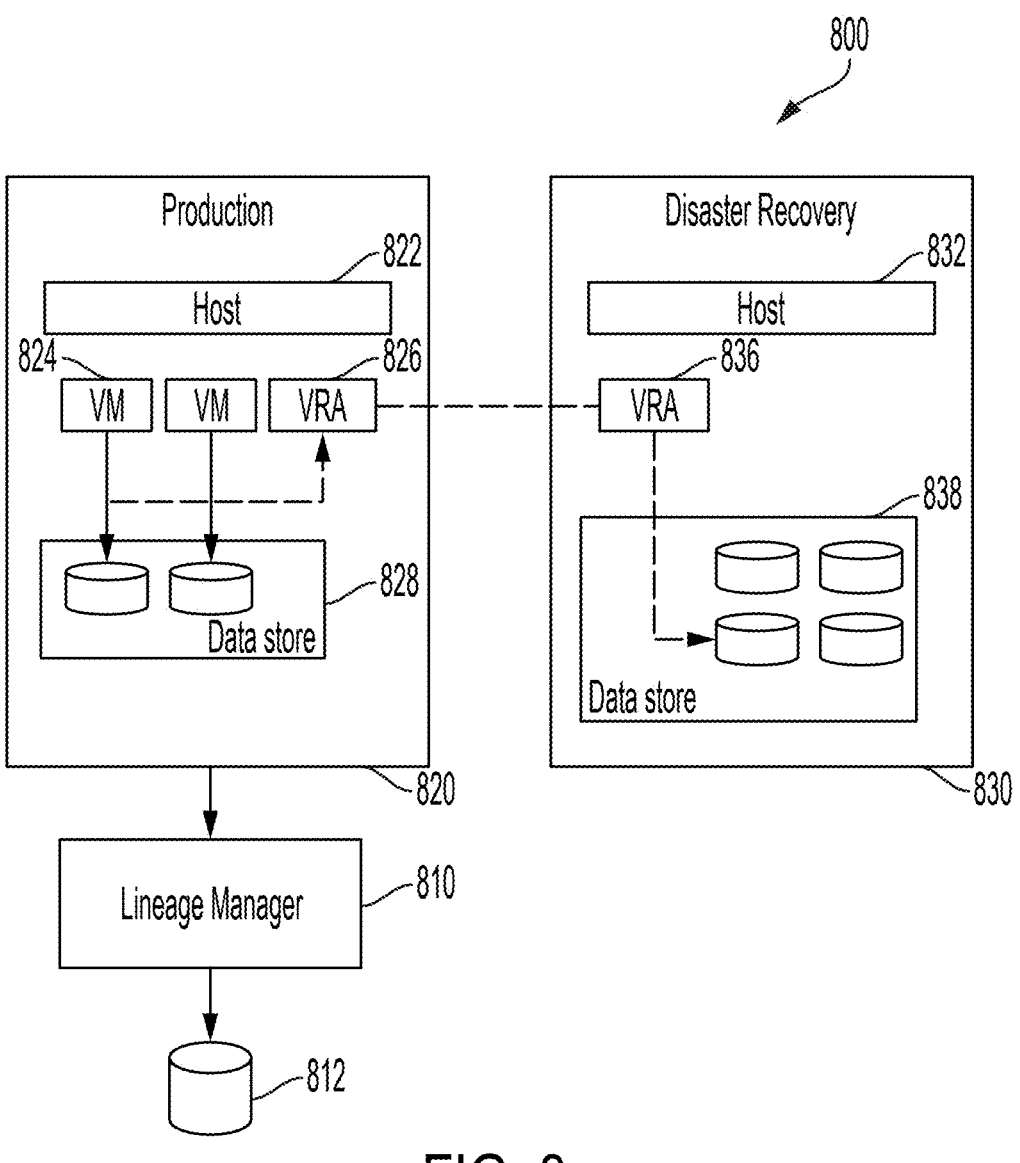
FIG. 8 depicts a system for disaster recovery according to example implementations.

FIG. 8 depicts a system 800, which illustrates another area where the concepts discussed in this application can be utilized. This system is described in the context of disaster recovery. The system 800 comprises a production server 820, a disaster recovery server 830, a lineage manager 810, and storage 812 coupled to the lineage manager.

The production server 820 represents the portion of the system that is performing the operations. The disaster recovery server 830 is used for data replication in case of failure of the production server 820. While illustrated as a single server, it is understood that the functionality of the production server 820 and disaster recovery server 830 can be distributed over a number of physical devices.

The host 822 represents the underlying hardware or software platform. Virtual machines 824 represent software-based emulations of computer systems. The machines 824 can operate by creating isolated environments within the host system 822. The machines 824 can utilize a hypervisor to manage and allocate physical hardware resources. The hypervisor abstracts the underlying hardware, allowing multiple VMs 824 to run concurrently on a single physical machine, each with its own operating system, applications, and allocated resources such as CPU, memory, storage, and network interfaces.

Data storage 828 houses the executable code and operational data for the production environment. The data storage 828 can be accessible by multiple servers and distributed between different physical locations, for example, in a cloud service. The storage system can designed to be scalable and accessible over a network as shown in the example of FIG. 1. In a cloud environment, the storage can be implemented as object storage for unstructured data, block storage for applications requiring low-latency access, and file storage for hierarchical data organization.

The disaster recovery server 830 acts as a backup environment, which is available to take over operations if the production server 820 fails. In example implementations, the disaster recovery server 830 is configured to mirror the structure of the production server 820. The server 830 includes a host 832, which provides the platform for the disaster recovery environment. Data storage 838 can store replicated data from the production server 820. These components can be implemented as described with the respect to the server 820. The servers 820 and 830 do not necessarily include the same type of hardware components.

Disaster recovery server 830 includes a virtual recovery appliance 836, which is designed to restore data and system states from the production environment. This appliance 836 communicates with a counterpart virtual recovery appliance 826 of the production server 820. Together, these appliances 826 and 836 can coordinate the disaster recovery and business continuity service to protect the virtualized environment of the production server 820.

In example implementations, the disaster recovery service operates by continuously replicating data from production site(s) 820 to recovery site(s) 830. The sites can be on-premises, in the cloud, or a combination of both. For example, the service can utilize a hypervisor-based replication mechanism, which allows it to capture and transmit changes to virtual machines (VMs) in near real-time. This approach can enable the service to achieve recovery point objectives of seconds and recovery time objectives of minutes.

The disaster recovery can be implemented by a journal-based recovery system. In the event of data corruption or ransomware attacks, administrators can roll back to a specific moment before the incident occurred. The service can also provide automated failover and failback processes, simplifying the recovery procedure, and minimizing human error during critical situations.

In example implementations, this journal-based recovery system utilizes the concepts discussed herein. Rather maintain a journal by logging each change, the journal can be generated on demand by application of the replication policy and adjustment based on exceptions. This journal can be generated by the lineage manager 810 and associated memory 812 illustrated in FIG. 8. This device can recreate the lineage of data replication thereby eliminating the need for maintaining a real-time long.

In this context, a Recovery-Failure-Delete model can be utilized to include information regarding any recoveries or backup deletions or failure of backup generations are stored. A data structure for such a model is shown here.

| resource_id | recovery_point | recovery_time | target_id |
| --- | --- | --- | --- |

The data structure identifies the resource (resource_id), the recovery point (recovery_point) and the recovery time (recovery_time). The structure also provides the location of the data replication (target_id).

Figure 9:
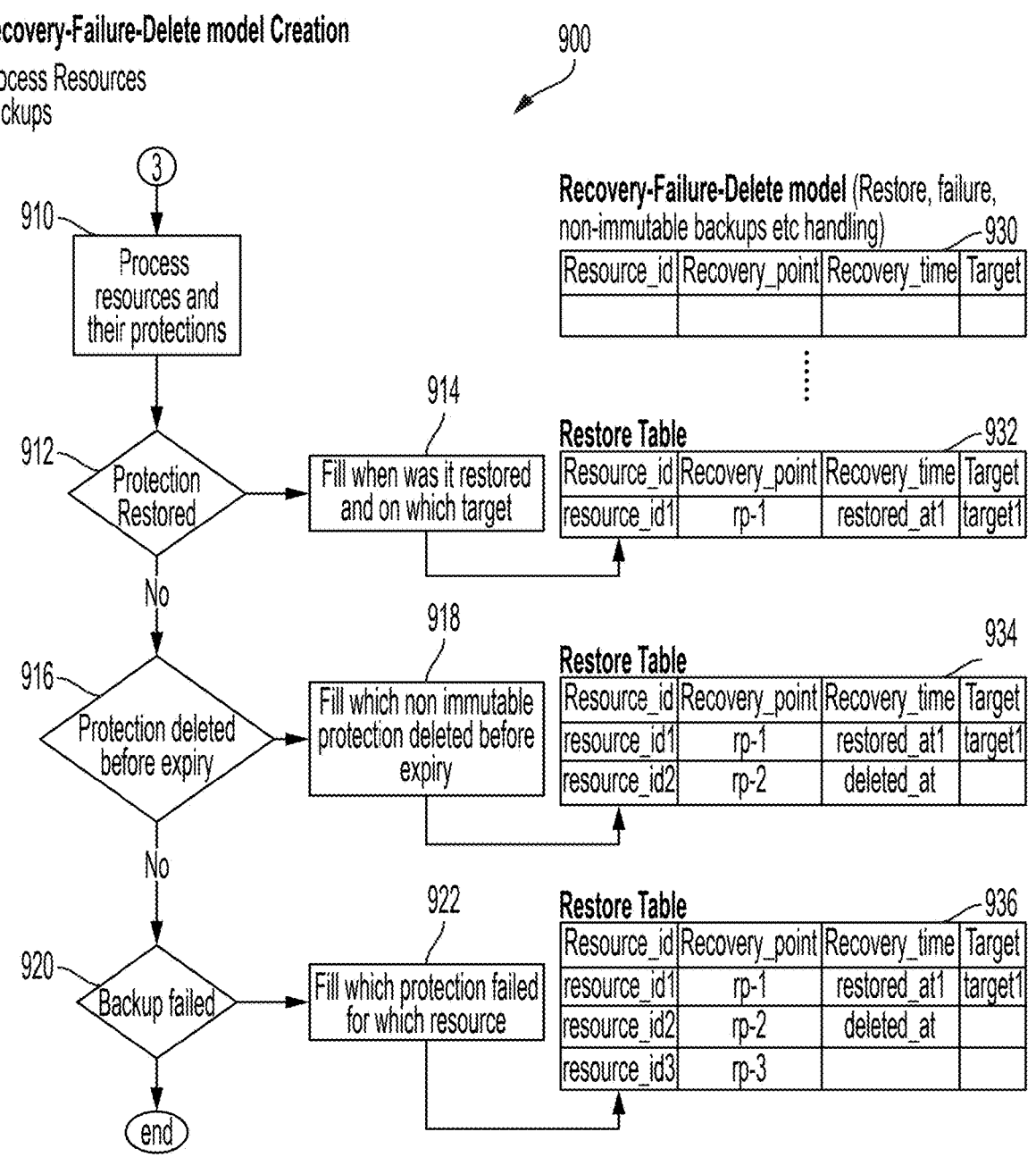
FIG. 9 depicts a flowchart for a process for creating a Recovery-Failure-Delete model according to example implementations.

FIG. 9 depicts an example process 900 flow for creating a Recovery-Failure-Delete model. As discussed herein, the model is designed to track exceptions and changes to backup operations to allow for accurate lineage reconstruction. This example outlines three main paths: protection restoration, protection deletion before expiry, and backup failure.

The process begins by processing resources and their protections, as indicated in step 910. From there, the flow branches into three possible scenarios, which can be performed in any order or concurrently. The first scenario, represented by steps 912 and 914, handles cases where a protection is restored, recording details such as when and on which target the restoration occurred. The second scenario, shown in steps 916 and 918, deals with situations where a protection is deleted before its scheduled expiry, capturing information about the deleted backup. The third scenario, illustrated by steps 920 and 922, manages instances where a backup fails, recording which protection failed for which resource.

Each of these scenarios results in updates to a restore table, as depicted by elements 930, 932, 934, and 936. This table stores information as discussed above. The structure of this table allows for efficient querying and reconstruction of the data lineage, even in complex scenarios involving multiple resources and backup operations.

Once existing data has been processed and the three tables 932, 934, and 936 have been created and filled, the rest of the update to the tables can happen through events as and when the occur. The flow would remain the same but would also include events such as "new protection created," "protection policy updated," or "new protection policy created," as examples.

Figure 10:
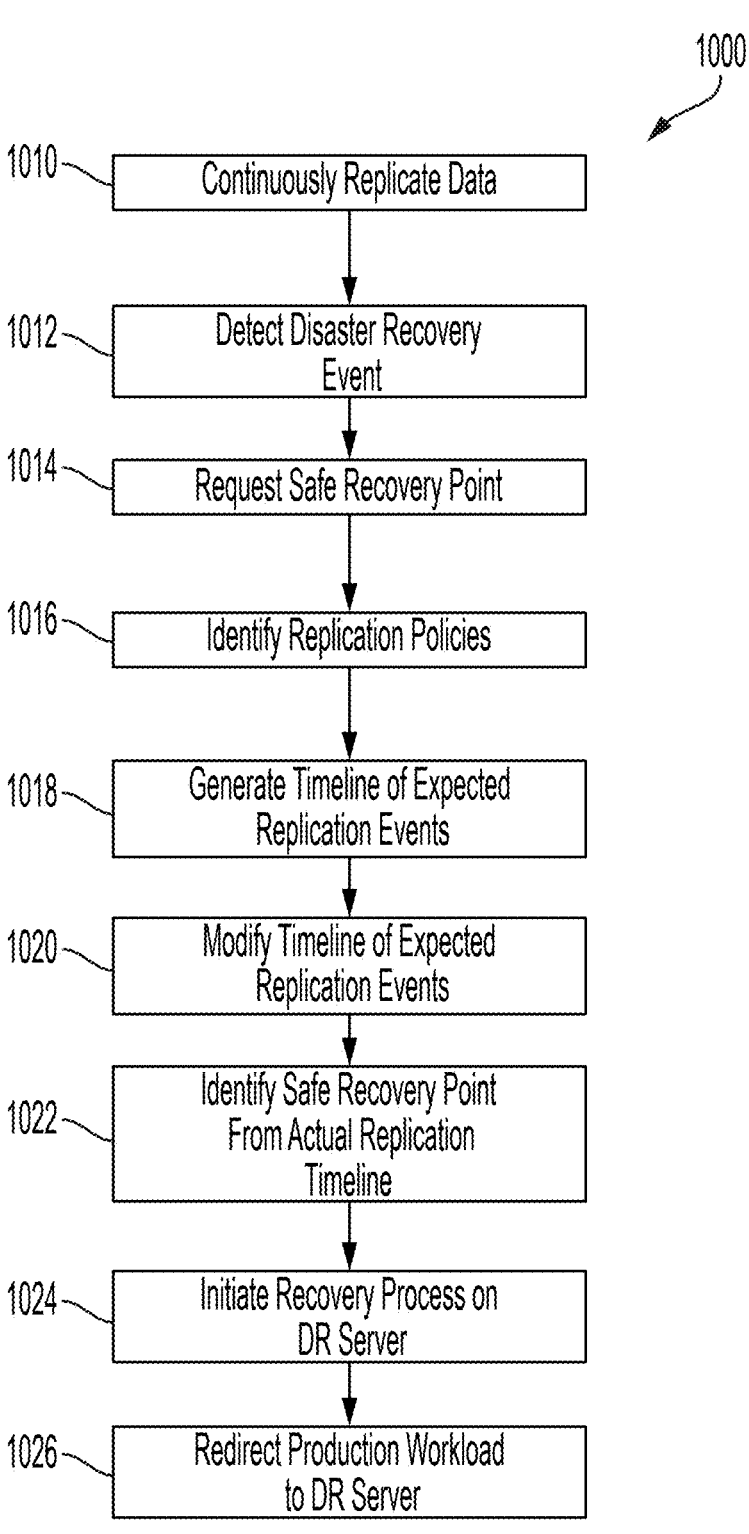
FIG. 10 depicts a flowchart of a method for facilitating disaster recovery using time-aware data lineage according to example implementations.

FIG. 10 illustrates a flowchart of a method for facilitating disaster recovery using time-aware data lineage. Data is continuously replicated from a production server to a disaster recovery server according to policy information as denoted in step 1010. In step 1012, a disaster event affecting the production server is detected. In response to this detection, step 1014 involves receiving a request for a safe recovery point within a specified time range prior to the disaster event.

The method proceeds to step 1016, where applicable replication policies within the specified time range are identified. These policies are used in step 1018 to generate a timeline of expected replication events within the specified time range. In step 1020, the timeline of expected replication events is modified based on exception information to create an actual replication timeline.

Step 1022 involves analyzing the actual replication timeline to identify a most recent safe recovery point before the disaster event. This safe recovery point is, for example, a successful replication event with no associated corruption events. Once identified, step 1024 initiates a recovery process on the disaster recovery server using the identified safe recovery point. Step 1026 involves redirecting the production workload to the disaster recovery server.

As discussed herein, the method can utilize a first data structure to maintain policy information for data protection of the production server. The policy information can include a policy identifier, a start time indicating when the policy became active, an interval specifying frequency of data replication to a disaster recovery server, and a target location on the disaster recovery server.

Additionally, a second data structure can be used to store exception information related to the continuous replication of data from the production server. This exception information may include details about replication failure events, data corruption events, or recovery point creation events. By utilizing these data structures and the described method, the system can efficiently manage disaster recovery scenarios while maintaining data integrity and minimizing downtime.

Implementations as discussed herein have been tested. FIGS. 11-15 demonstrate that the real-time generation approach of storing the policy details along with exceptions to the policies for each asset results in only a slight increase in the amount of storage space required to store information as the number of assets grows. In addition, the lineage can be recreated quickly as the number of records increases.

In the examples shown in these figures, the asset type considered is a virtual machine (VM). As discussed above, various other assets can utilize the concepts described herein.

Figures 11, 12:
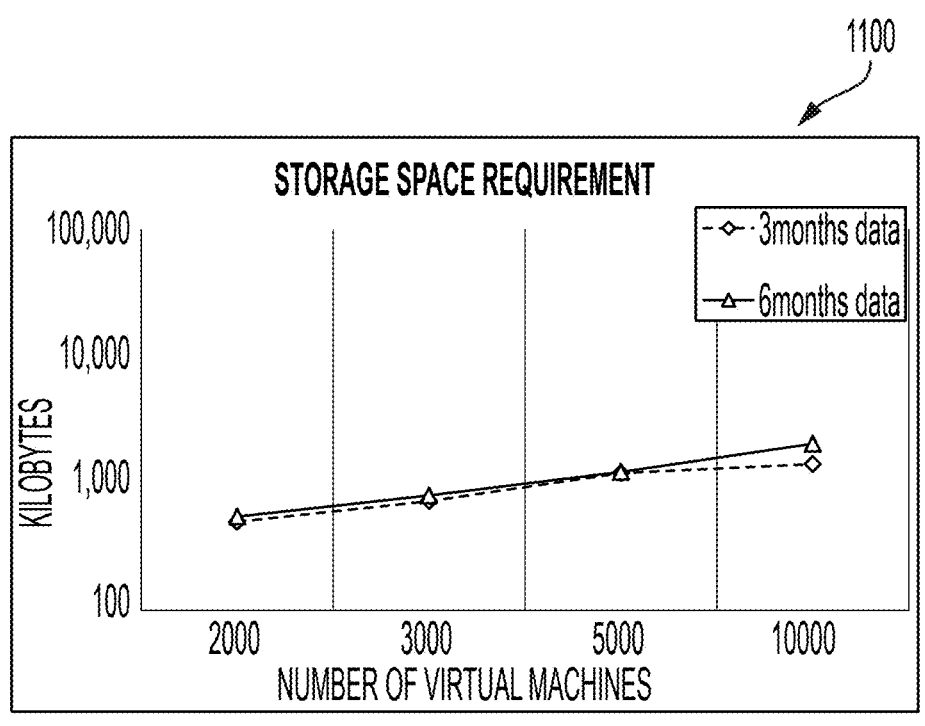
FIGS. 11-15 depicts graphical information showing testing of example implementations.

FIG. 11 shows a comparison of the storage space required to maintain the policy and exception models as a function of the number of virtual machines being tracked. This graph shows that for 5000 VM assets the space requirement is around 1000 KB for both six months and three months' worth of lineage data. With 10,000 VM assets the storage space rises only marginally. Hence the solution is scalable and storage efficient irrespective of the amount of storage data lineage that needs to be generated even with varying number of resources.

As discussed herein, creating the storage data lineage involves retrieving relevant policies and generating backup records for each asset within the specified time range. This process is repeated for all requested assets and policies, a process that can be parallelized to compute efficiently. By focusing on record generation rather than retrieval, vectorized operations can be utilized for computational intensity. This approach streamlines lineage computation while ensuring accuracy and speed.

FIG. 12 illustrates the access time as a function of the number of virtual machines. As can be seen from the figure, the time taken to generate lineages for 100 VMs from data stores having 2 k, 3 k, or 10 k records is almost constant. The time taken to generate lineages for 25, 50, 75, or 100 VMs is also almost constant and does not increasing linearly. This data shows that the technique is scalable and provides similar response time irrespective of the amount of storage data lineage that needs to be generated even with a varying number of resources.

Figure 13:
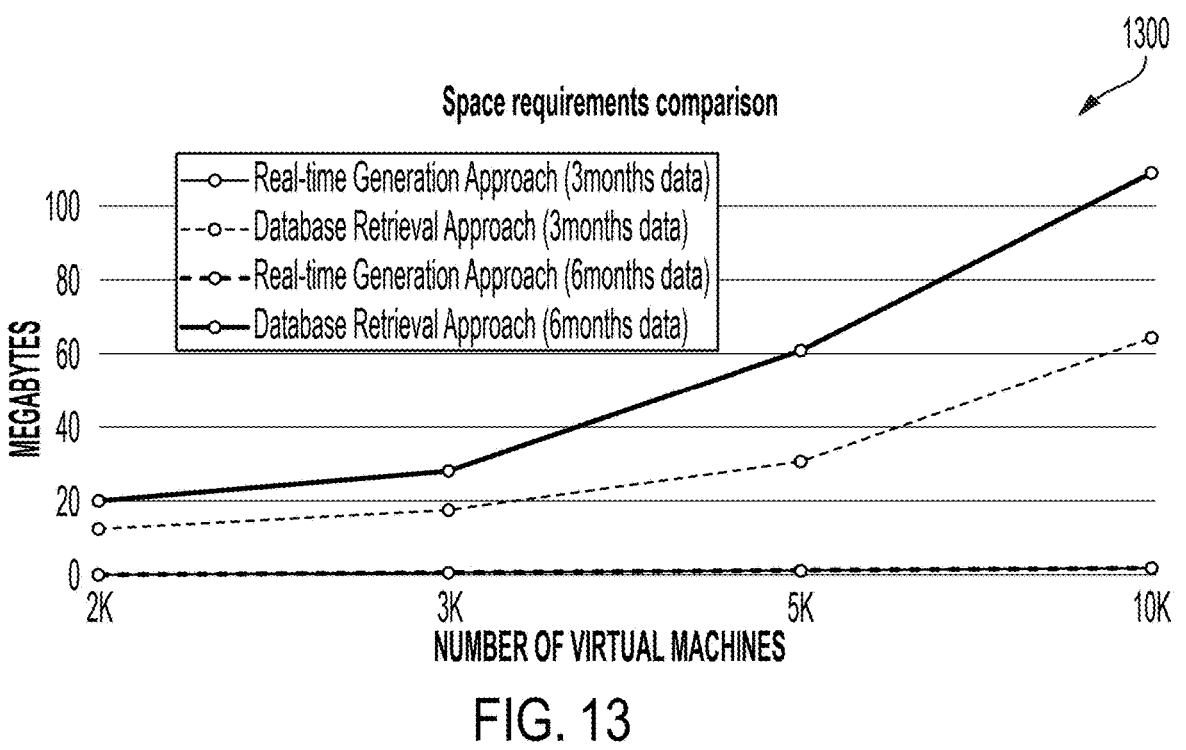

FIG. 13 compares the space requirements of a database retrieval approach where events are logged and stored in the database with the real-time generation approach where the lineage is recreated based on the policy and exception models. To generate this data, a dataset with a varying number VM data assets underwent policy-driven backups for different durations (three and six months). The space required to store relevant records using both approaches was measured across datasets of various sizes. The results show that the real-time generation approach is highly scalable, with over ninety percent less space required compared to the database retrieval approach, as depicted in the graph. The experiment considered changes to policies, backup deletions, and failures to ensure a comprehensive evaluation.

When comparing database queries for record retrieval with real-time in-memory computation, the efficiency largely depends on dataset size and backup volume. While smaller datasets may see comparable performance between fetching from a database and real-time computation, scaling up with numerous assets and extended lineage periods favors real-time in-memory computation. Implementations discussed here involve fetching relevant policies and generating backup records within memory, tailored to the requested lineage time intervals. This process is repeated for each asset and policy, utilizing parallel computation for multiple data assets simultaneously. Unlike methods reliant on database searches, this approach prioritizes compute-intensive functionality for generating accurate records efficiently.

Figure 14:
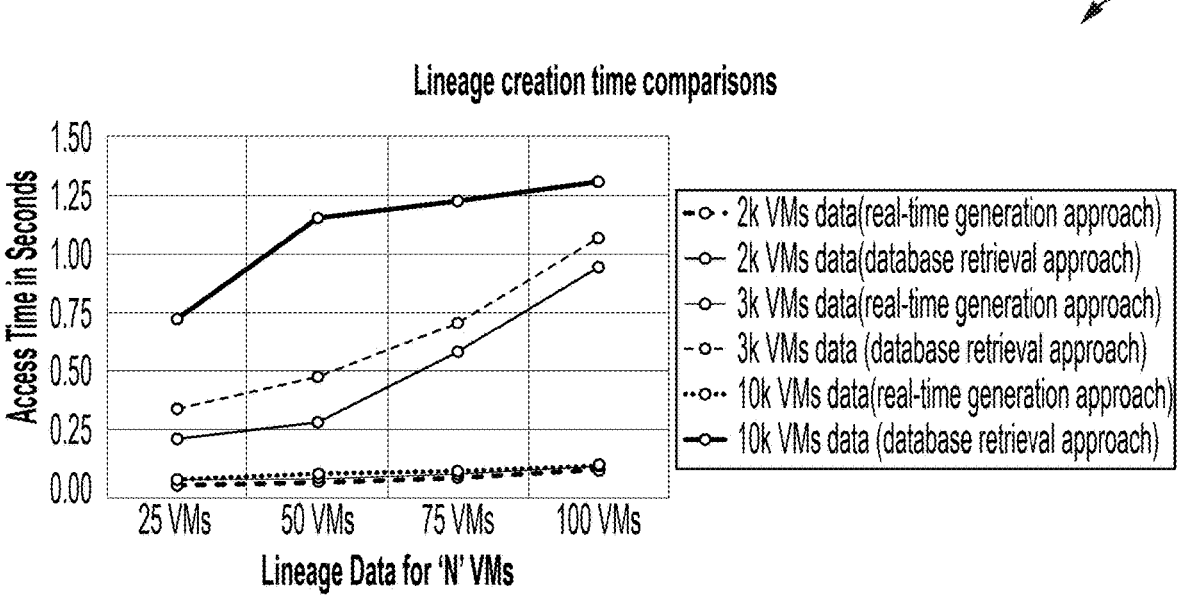
Figure 15:
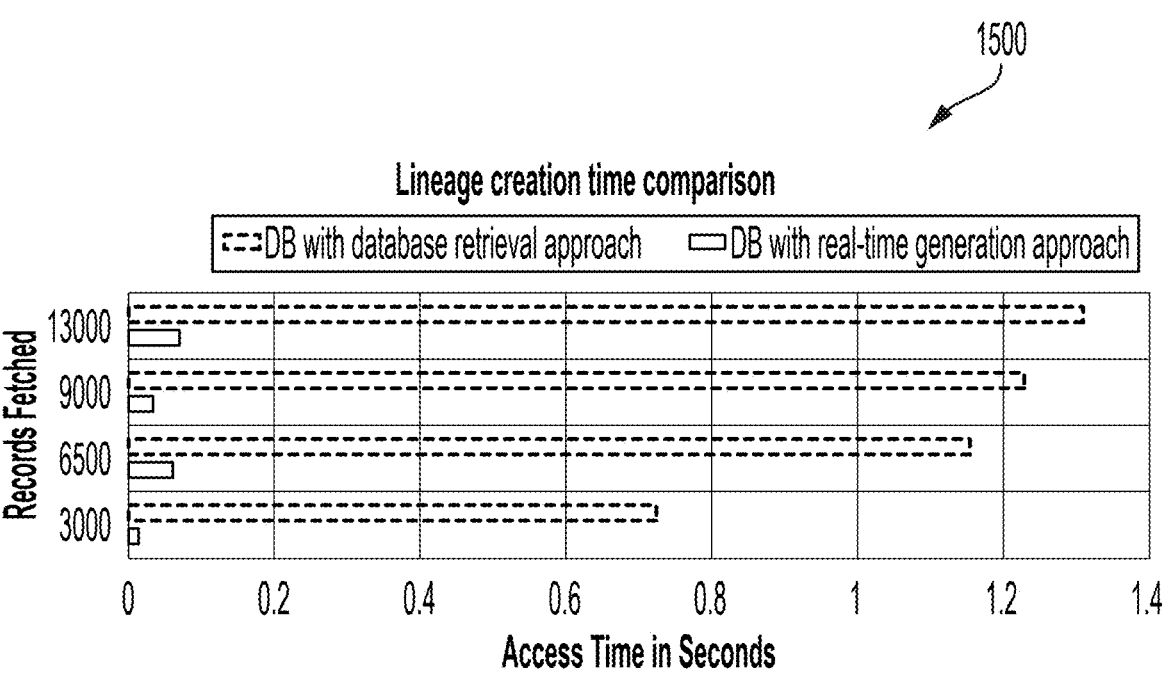

The real-time generation approach of recreating the lineage consistently provides data lineage in milliseconds regardless of dataset size as shown in FIGS. 14 and 15. By contrast, the database retrieval approach requires increasing retrieval times as the number of assets rises. The comparison is illustrated in the two charts. FIG. 14 depicts access times for databases with varying numbers of virtual machines and FIG. 15 depicts access times for varying number of records to be accessed. These graphs illustrate the stable duration of time-aware generation regardless of resource count and data accumulation period.

FIG. 15 shows the time taken to access the relevant records using the database retrieval method versus the lineage recreation method for varying records sizes. It can be seen here that the amount of time required grows exponentially for the database retrieval approach whereas recreation approach is still able to generate the same data in much less time with only slight variation with the increasing number of records.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A computer system comprising:
one or more processors;
non-transitory memory storing instructions that, when executed by the one or more processors, cause the computer system to:
    identify policy information applicable to a compute resource within a specified time range, the policy information related to data management for the compute resource;
    generate, based on the identified policy information, a set of expected data management events for the compute resource within the specified time range; and
    modify the set of expected data protection events based on information related to exceptions to the data management indicated by the policy information, wherein the modified set of data protection events provides lineage information for the compute resource.

2. The system of claim 1, wherein the policy information comprises:
a resource identifier;
a policy identifier;
an interval specifying a frequency of data events; and
a target indicating a storage location for data of the compute resource.

3. The system of claim 2, wherein the policy information further comprises a start time indicating when the policy became applicable to the compute resource and an end time indicating when the policy became no longer applicable to the compute resource.

4. The system of claim 2, wherein the data management comprises data storage and wherein the policy information further comprises expiry information indicating for how long the data is stored.

5. The system of claim 1, wherein the data management comprises data storage and wherein the exception information comprises information related to recovery events, protection failure events, or deletion events.

6. The system of claim 1, further comprising:
database storage storing the policy information and the exception information; and
a plurality of compute resources;
wherein the compute resource is one compute resource of the plurality of compute resources; and
wherein the database storage stores policy information and exception information for each of the compute resources of the plurality of compute resources.

7. A computer-implemented method comprising:
storing, in a first data structure format, policy information for data history related to data of each resource of a plurality of resources; and
storing, in a second data structure format, exception information related to the data history of the plurality of resources;
wherein the first data structure and the second data structure store information sufficient to generate lineage information for any of the plurality of resources.

8. The method of claim 7, wherein the policy information for each policy of each resource comprises:
a policy identifier;
an interval specifying a frequency of data events; and
a target indicating a storage location for data of the resource.

9. The method of claim 7, wherein, for a first resource of the plurality of resources, the policy information comprises a start time indicating when the policy became applicable to the resource and an end time indicating when the policy became no longer applicable to the first resource, the method further comprising storing, in the first data structure, policy information for data history related to the data of the first resource beginning at a second start time after the end time.

10. The method of claim 7, wherein the first data structure is organized to store information related to a resource identifier, storage interval information indicating how often the data is stored, storage expiry information indicating for how long the data is stored, and target information indicating where the data is being stored.

11. The method of claim 10, wherein the first data structure is organized to store further information related to a policy identifier, a start time indicating when the policy became applicable to the resource and an end time indicating when the policy became no longer applicable to the resource.

12. The method of claim 7, wherein the second data structure is organized to store information related to a resource identifier, a recovery point, a recovery time, and a target identifier.

13. The method of claim 7, further comprising:

receiving a request for the lineage information for one of the resources over a specified time range;

identifying, from the first data structure, applicable policies for the one of the resources within the specified time range;

generating, based on the identified applicable policies, a set of expected data management events for the one of the resources within the specified time range; and modifying the set of expected data management events based on exception information from the second data structure, wherein the modified set of data management events provides the lineage information for the one of the resources.

14. A computer-implemented method comprising:

identifying policy information applicable to a compute resource within a specified time range, the policy information related to data management for the compute resource;

generating, based on the identified policy information, a set of expected data management events for the compute resource within the specified time range; and modifying the set of expected data protection events based on information related to exceptions to the data management indicated by the policy information, wherein the modified set of data protection events provides lineage information for the compute resource.

15. The method according to claim 14, wherein:

identifying the policy information comprises identifying a plurality of backup policies applicable to the compute resource;

generating the set of expected data management events comprises generating, for each identified policy, a sequence of expected backup events within the specified time range based on a start timestamp, end timestamp, and backup interval of that policy and merging the sequences of expected backup events from all identified policies into a combined timeline of expected backups; and modifying the set of expected data protection events comprises retrieving exception information related to the compute resource within the specified time range and modifying the combined timeline of expected backups based on the retrieved exception information to create an actual backup lineage, wherein the exception information comprises actual backup events that differ from expected backups, backup failure events, or backup deletion events.

16. The method of claim 15, wherein the identified backup policies overlap with the specified time range.

17. The method of claim 15, further comprising transferring backup data to the compute resource based on the lineage information.

18. The method of claim 14, further comprising:

continuously replicating data from a production server to a disaster recovery server according to policy information;

detecting a disaster event affecting the production server;

in response to the detection, receiving a request for a safe recovery point within a specified time range prior to the disaster event;

wherein identifying the policy information comprises identifying applicable replication policies within the specified time range;

wherein generating the set of expected data management events comprises generating, based on the identified policies, a timeline of expected replication events within the specified time range;

wherein modifying the set of expected data protection events comprises modifying the timeline of expected replication events based on exception information to create an actual replication timeline; and wherein the method further comprises:

analyzing the actual replication timeline to identify a most recent safe recovery point before the disaster event;

initiating a recovery process on the disaster recovery server using the identified safe recovery point; and redirecting production workload to the disaster recovery server.

19. The method of claim 18, further comprising maintaining, in a first data structure, policy information for data protection of the production server, wherein the policy information comprises:

a policy identifier, a start time indicating when the policy became active, an interval specifying frequency of data replication to a disaster recovery server, and a target location on the disaster recovery server.

20. The method of claim 18, further comprising storing, in a second data structure, exception information related to the continuous replication of data from the production server, wherein the exception information comprises a replication failure event, a data corruption event, or a recovery point creation event.

* * * * *